(12) United States Patent
Messing et al.

(10) Patent No.: US 11,193,470 B2
(45) Date of Patent: Dec. 7, 2021

(54) METHOD FOR OPERATING A WIND TURBINE

(71) Applicant: Wobben Properties GmbH, Aurich (DE)

(72) Inventors: Ralf Messing, Aurich (DE); Stefanie Bott, Bremen (DE); Hendrik Schnell, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/972,436

(22) PCT Filed: Jun. 6, 2019

(86) PCT No.: PCT/EP2019/064809
§ 371 (c)(1),
(2) Date: Dec. 4, 2020

(87) PCT Pub. No.: WO2019/234168
PCT Pub. Date: Dec. 12, 2019

(65) Prior Publication Data
US 2021/0231101 A1    Jul. 29, 2021

(30) Foreign Application Priority Data

Jun. 6, 2018    (DE) ..................... 10 2018 113 531.9

(51) Int. Cl.
*F03D 7/02*    (2006.01)

(52) U.S. Cl.
CPC ...... *F03D 7/0224* (2013.01); *F05B 2270/323* (2013.01); *F05B 2270/324* (2013.01); *F05B 2270/33* (2013.01); *Y02E 10/72* (2013.01)

(58) Field of Classification Search
CPC .. F03D 7/0224; Y02E 10/72; F05B 2270/323; F05B 2270/324; F05B 2270/33
(Continued)

(56) References Cited

U.S. PATENT DOCUMENTS 7,023,105 B2    4/2006 Wobben
7,420,289 B2 *    9/2008 Wang ..................... F03D 17/00
                                                290/44

(Continued)

FOREIGN PATENT DOCUMENTS

DE    102010054013 A1    6/2012
DE    102016123450 A1    6/2018
(Continued)

*Primary Examiner* — Pedro J Cuevas
(74) *Attorney, Agent, or Firm* — Seed IP Law Group LLP

(57) ABSTRACT

A method for operating a wind turbine, in particular at a location characterized by a cold climate is provided. The method includes, specifying an air density at a location of the wind turbine, setting a blade angle of an adjustable rotor blade based on an output power, torque and/or rotor speed. The method includes setting the blade angle as a function of a at pitch characteristic curve which specifies the blade angle as a function of the output power, the torque and/or the rotor speed and as a function of the air density. According to the pitch characteristic curve, the blade angle has a minimum as a function of the air density in a region of a reference density of an atmosphere at the location which is characterized by a cold climate.

27 Claims, 5 Drawing Sheets

(58) Field of Classification Search
USPC .................................................. 290/44, 55
See application file for complete search history.

(56) References Cited

U.S. PATENT DOCUMENTS

| | | | | |
|---|---|---|---|---|
| 7,629,702 | B2* | 12/2009 | Schubert | F03D 7/042 290/44 |
| 8,096,761 | B2* | 1/2012 | Fric | F03D 7/0224 416/1 |
| 8,258,643 | B2* | 9/2012 | Bonnet | F03D 7/0296 290/44 |
| 8,618,684 | B2* | 12/2013 | Merkel | F03D 7/0272 290/44 |
| 8,779,611 | B2 | 7/2014 | Kabatzke et al. | |
| 8,878,378 | B2* | 11/2014 | Kabatzke | F03D 7/0224 290/44 |
| 9,127,642 | B2* | 9/2015 | Zhu | F03D 17/00 |
| 10,161,383 | B2* | 12/2018 | Pineda Amo | F03D 7/0224 |
| 10,669,987 | B2* | 6/2020 | Pineda Amo | F03D 7/042 |
| 2007/0216166 | A1* | 9/2007 | Schubert | F03D 7/0224 290/55 |
| 2008/0112807 | A1* | 5/2008 | Uphues | F03D 7/0224 416/1 |
| 2008/0140263 | A1* | 6/2008 | Wang | F03D 17/00 700/291 |
| 2009/0295160 | A1* | 12/2009 | Wittekind | F03D 7/0276 290/44 |
| 2010/0098540 | A1* | 4/2010 | Fric | F03D 7/0224 416/36 |
| 2012/0146332 | A1* | 6/2012 | Kabatzke | F03D 7/0224 290/44 |
| 2012/0148402 | A1* | 6/2012 | Kabatzke | F03D 7/0276 416/1 |
| 2012/0292903 | A1* | 11/2012 | Merkel | F03D 7/028 290/44 |
| 2013/0045098 | A1 | 2/2013 | Taylor | |
| 2013/0101413 | A1 | 4/2013 | Esbensen et al. | |
| 2013/0280066 | A1 | 10/2013 | Scholte-Wassink et al. | |
| 2015/0354535 | A1* | 12/2015 | Pineda Amo | F03D 7/0224 416/1 |
| 2016/0146189 | A1 | 5/2016 | Cook et al. | |
| 2019/0264653 | A1* | 8/2019 | Pineda Amo | F03D 7/0224 |
| 2019/0301429 | A1 | 10/2019 | Messing et al. | |
| 2020/0116126 | A1* | 4/2020 | Jamuna | F03D 7/04 |
| 2021/0190036 | A1* | 6/2021 | Schaper | F03D 7/0224 |

FOREIGN PATENT DOCUMENTS

| | | |
|---|---|---|
| EP | 1368566 B1 | 12/2006 |
| EP | 1918581 A2 | 5/2008 |
| EP | 2463520 A2 | 6/2012 |
| EP | 2527643 A2 | 11/2012 |
| WO | 02/068818 A1 | 9/2002 |

* cited by examiner

METHOD FOR OPERATING A WIND TURBINE

BACKGROUND

Technical Field

The present invention relates to a method for operating a wind turbine, in particular at a location which is characterized by a cold climate and has an air density, and to a device for operating a wind turbine, and to a wind turbine.

Description of the Related Art

A wind turbine of the type mentioned at the beginning is preferably embodied as what is referred to as a horizontal-axis wind turbines in which the rotor axis is arranged essentially horizontally, and the rotor blades pass over an essentially vertical rotor face. Such modern wind turbines usually have three rotor blades whose blade angle can also be adjusted. Such a wind turbine therefore has an aerodynamic rotor with rotor blades which are adjustable in the blade angle (pitch angle) thereof, wherein the rotor can be operated with a variable rotor speed, and has a generator which is coupled to the aerodynamic rotor.

In this context, the blade angle of a rotor blade can be adjusted between a feathered position of approximately 90° up to an optimum performance angle during partial load operation.

For the priority application for the present application, the German Patent and Trademark Office has searched the following prior art: DE 102010054013 A1, DE 102016123450 A1, US 2013/0045098 A1, US 2013/0101413 A1, US 2013/0280066 A1, US 2016/0146189 A1, EP 1368566 B1, EP 1918581 A2 and EP 2463520 A2.

BRIEF SUMMARY

The optimum performance angle during partial load operation depends on various parameters. Generally, this angle can lie in a region around approximately 0 degrees or above. It can also vary depending on the type of turbine and under certain circumstances it can also be advantageous to adjust a blade handle during partial load operation to somewhat below 0°, e.g., to −0.5°.

The adjustment of a blade angle ($\alpha$) of an adjustable rotor blade, in particular any blade angle ($\alpha$) of the adjustable rotor blades is basically used to turn the rotor blade or blades out of the wind starting from a rated wind speed (rated operation) essentially with a wind speed which continues to rise, specifically to increase its blade angle. That is to say in the present case the terminology is basically used that a blade angle is increased toward the feathered position. In a partial load region in which the wind speed has not yet reached the rated wind speed, an optimum performance blade angle is set. Nevertheless, this can also basically be given different settings at different rotational speeds, that is to say does not have to be constant for different rotational speeds.

This blade angle which is also referred to as a partial load angle is therefore especially optimized aerodynamically and, if appropriate, selected in a load-optimized fashion. For this purpose, the wind turbine is as far as possible operated with an optimized tip speed ratio for this partial load operation. In this context, it is to be noted that this optimized partial load angle is adjusted to the optimized top speed ratio, that is to say the ratio of the rotor speed with respect to the wind speed—or better the blade tip with respect to the wind speed.

Currently, power calculations for a wind turbine are carried out with the assumption of a standard atmosphere. The standard density $\rho\_norm$ which is used in this case for the air density $\rho$ is $\rho\_norm=1.225$ kg/m³, i.e., according to the regulations of the International Civil Aviation Organization (ICAO) for a standard atmosphere (ISA). The standard air density of 1.225 kg/m³ is achieved at 15° C. and 5 m above sea level. Therefore, a wind turbine is configured, for example, according to a predetermined temperature envelope according to the IEC (International Electrotechnical Commission)—the relationship between the air density $\rho$ requires the temperature T to be taken into account and, if appropriate, the air humidity, e.g., by means of the gas constant R_f of the humid air if an ideal gas equation at a pressure p is assumed:

$$\rho = \frac{1}{R\_f} * \frac{p}{T}$$

In this way, the density can also be determined computationally by means of the measurement of pressure, temperature and, if appropriate, humidity of the air. It is also possible to use the altitude of the location of the wind turbine in order to determine the air density $\rho$ at the location.

It is also basically known that the air density which is relevant for a wind turbine should be taken into account during the operation of a wind turbine. Adapting an operational control system as a function of the air density which is relevant for the wind turbine is known from EP 1 368 566 B1. With respect to the electrical power which is generated by the turbine the following applies:

$$P = \frac{\rho}{2} v_\infty^3 A c_p \eta = \frac{\rho}{2} \frac{v_{tip}^3}{\lambda^3} A c_p \eta$$

In this context, A represents the swept rotor area, $\eta$ represents the efficiency level of the electric drive train (especially the generator efficiency level) and $c_p$ represents the aerodynamic power coefficient. The aerodynamic power coefficient is assumed to be constant below. The assumption that the power P and the other variables of the equation could be kept constant follows initially for the blade tip speed:

$$v_{tip} = \sqrt[3]{\frac{2P\lambda^3}{\rho A c_p \eta}} \sim \sqrt[3]{\frac{1}{\rho}}$$

The blade tip speed $v_{tip}$ would then be basically inversely proportional to the third route of the density $\rho$, or the power would be directly proportional to the density $\rho$ assuming the other variables are constant.

According to EP 1 368 566 there is provision to store in the control device of a wind turbine a power characteristic curve which permits the controller of the wind turbine to determine the assigned generator power from the determined rotor speed which is dependent on the wind speed. It has been recognized that if the quantity of energy of the wind is too small, the rotor of the generator cannot provide applied generator torque, and therefore the rotor speed can drop owing to an excessively high generator torque. It is proposed as a solution in EP 1 368 566 B1 that the altitude of the installation site of the wind turbine above sea level takes into account the lower air density in the power characteristic curve. As a result of this, the power which is assigned to a rotor speed and therefore to a specific tip speed ratio and which is to be generated by the wind turbine can be adapted, that is to say the generator torque does not exceed the torque supplied via the rotor, owing to the exciter current which is set by the control device. This leads to a situation in which the efficiency level which is defined by means of the power characteristic curve is maintained and the maximum energy can be extracted from the wind.

The air density can also influence a noise level; for example, US 2013/0280066 A1discloses a method for operating a wind turbine, wherein the noise generated by the wind turbine remains below a predefined noise emission level in a noise reduction mode based on at least one setpoint value of a wind turbine parameter. There is provision to apply a correction factor to the at least one setpoint value of a wind turbine parameter. The correction factor is determined as a function of a value which is related to the air density. For this purpose, it is presented as advantageous that regulations relating to a noise level can be complied with better at cold locations by means of a noise level management system (SPE) or a noise reduction operating mode (NRO) taking into account the air density.

The power-related dependencies within the scope of a regulating system are, however, complex—for example, US 2013/0101413 A1 discloses a method for controlling the blade angle of a wind turbine with a rotor with at least one rotor blade. The setting of the corresponding attitude angle of the at least one rotor blade is considered to be a function of specific air density. For this purpose, a reference pitch angle is corrected by means of a correction pitch angle so that it is possible to retrofit existing pitch controllers with this method. According to FIG. 2 of US 2013/0101413 A1, as expected a power level of a wind turbine with an air density at a specific wind speed rises owing to the kinetic energy which is input by the wind per period of time in a density-dependent fashion. Although it is also the case that an increased air density will not necessarily bring about an increased rotor speed (at any rate not in the variable speed regulating range for the rotor at low wind speeds), according to FIG. 3 of US 2013/0101413 A1 the power increases with the air density when there is a fixed specific rotor speed; this can be achieved by setting a relatively high generator torque at a relatively high air density. Starting from a specific upper rotor speed, a generator torque is increased; this can be the rated rotor speed. The power of the wind turbine accordingly rises as the wind speed increases, owing to the increased generated torque.

According to US 2013/0101413 A1, that pitch angle (blade angle) at which the highest power level of the wind turbine can be achieved is accordingly optimal, and the optimized pitch angle is accordingly the one which requires the least wind speed to achieve a specific power. For this way of regulating optimization of the power the optimized pitch angle is specified for an air density of 1.0 kg/m$^3$ and 0.8 kg/m$^3$ which is reduced with respect to a standard density of 1,225 kg/m$^3$ according to the IEC Standard. It is apparent that the influence of the air density on pitch angle which is optimized in this way is comparatively strong according to FIG. 4 in US 2013/0101413 A1.

EP 2 463 520 A2 relates to a method for operating a pitch-regulated wind turbine at which a setpoint value M for the generated torque is assigned as a function of a rotational speed n of the generator or rotor. During partial load operation, the setpoint value for the generated torque is increased as the rotational speed increases. During rated load operation, the rotational speed n3 is regulated by the adjustment of the blade setting angle at a setpoint value M3. A transition from partial load operation into rated load operation occurs at a transition point which is defined by a value for the rotational speed n3 and a setpoint value for the generated torque M3. Values of the transition point are determined as a function of a current value of the air density, wherein as the air density drops the rotational speed n3 is increased and/or the setpoint value for the generated torque M3 is reduced.

Accordingly, it is basically known to specify an air density at the location of the wind turbine and to set each blade angle of the adjustable rotor blades while specifying, in particular as a function of, an output level and/or the rotor speed. Wind turbines are increasingly installed in very remote regions which can deviate climatically and from the installation altitude of customary boundary conditions. The greater the extent to which the boundary conditions, particularly atmospheric conditions, deviate from customary requirements, the smaller the extent to which the assumption on which the calculation of the optimum partial load angle and, if appropriate, an optimum tip speed display ratio are based, fit the installation site. Accordingly, at least a lower efficiency level can occur during partial load operation. This can therefore lead to a situation in which partial load operation as planned is not possible, or at least occurs in a comparatively unstable fashion. However, these assumptions no longer apply at least quantitatively at locations at, for example, a high altitude and/or with temperatures which are increased on average. At locations at high altitude, serious deviations in the density toward relatively low values of up to around 30% of the design conditions based on the standard density ρ_norm used can certainly occur.

EP 1 918 581 A2 provides, on the other hand, that a temperature of the surroundings of a wind turbine is measured and the output power level of the wind turbine is lowered if the surrounding air temperature is below a predetermined limit, in order as a result to reduce loads on components of the wind turbine—determination of the air density by measuring the ambient pressure and ambient temperature under cold weather conditions can be used to reduce the load acting on the wind turbine according to the specific air density, so this density lies within that permissible load for which the wind turbine is configured.

It has nevertheless proven relevant to optimize the annual production (AEP—Annual Energy Production) of a wind turbine. This applies, in particular, to the abovementioned case of a changed air density. As the air density becomes lower, the available wind power can become smaller, while as the air density rises loads on the wind turbine can become greater. It is desirable to use an available wind power level in an overall best possible way and nevertheless take into account disadvantageous effects for the wind turbine, such as, e.g., loads as the air density rises.

However, according to the prior art, the blade angle (pitch angle) is, depending on the air density at a constant power level, basically a monotonously falling function, as explained at the beginning. Rotor blades are configured for a "cold climate" air density; i.e., an air density in cold surroundings with respect to the configuration of the system, in such a way that even under the hardest climatic conditions and with the greatest possible deflection of the rotor blade, a sufficient distance is still produced between the blade tip and the tower when the tower is passed, and what is referred to as the tower clearance therefore always assumes values significantly>0 and as a result there is never fatal contact between the blade tip and the tower.

A "cold climate" air density at sea level can, for example, preferably be assumed as a reference density $\rho 0$ where $\rho 1.3$ kg/m³, wherein it is understood that the value $\rho>=1.3$ kg/m³ is basically selected by way of example, and another value between a standard density $\rho\_norm$ and 1.3 kg/m³ could be selected as a "cold climate" air density for a reference density. If systems are upgraded for such so-called "cold climate" conditions, the tower clearance must accordingly also be ensured for these relatively high air densities at which larger loads and therefore larger blade deflections occur than at the standard air density $\rho\_norm=1.225$ kg/m³. The definition of the operational control system and here, in particular, the specification of a blade angle under partial load and for entry into the rated load region should therefore be performed in such a way that the tower clearance is ensured under "cold climate" conditions.

Provided is a method and a device for operating a wind turbine with a rotor and a generator which is driven by means of the rotor, in particular for generating electrical power, and a corresponding wind turbine.

In particular, nevertheless the available wind power level is to be used overall in an improved way by taking into account an air density which is relevant for the wind turbine, in particular in accordance with "cold climate" conditions and advantageously while safeguarding the tower clearance.

In particular, the annual energy production of a pitch-controlled or rotational-speed-variable wind turbine with an adaptable blade angle is to be achieved. This is to be understood as an increased AEP of a wind turbine, wherein preferably nevertheless effects on the surroundings and/or excessive loads on the wind turbine are to be kept under control—in comparison with standard conditions—at relatively low and relatively high air densities.

Provided is a method or a corresponding device for performing open-loop and/or closed-loop control or in a corresponding wind turbine the operational control system is to be adapted as a function of the, in comparison with standard conditions, lower and higher air density for the wind turbine, in such a way that an electrical power level of the generator which is to be output can be optimized or improved and nevertheless the specified loads can be kept under control.

In particular, provided is a corresponding device for performing open-loop and/or closed-loop control of a wind turbine and a corresponding wind turbine which takes into account this object.

The method of the type mentioned at the beginning is based on the fact that in order to operate a wind turbine, in particular at a location which is characterized by a cold climate, the wind turbine has:
  an aerodynamic rotor with rotor blades which are adjustable in the blade angle thereof, wherein the rotor can be operated with a variable rotor speed, and a generator which is coupled to the aerodynamic rotor, in particular in order to generate an output level. The method comprises the steps of:
  specifying the air density at the location of the wind turbine
  setting a blade angle ($\alpha$) of an adjustable rotor blade, in particular of each blade angle of the adjustable rotor blades, while predefining, in particular as a function of, an output power and/or a torque and/or the rotor speed.

There is also provision that
  the blade angle is set while predefining, in particular as a function of, at least one pitch characteristic curve which specifies the blade angle as a function of the output power and/or of the torque and/or of the rotor rotational speed and as a function of the air density, wherein
  in order to take into account an air density at the location of the wind turbine, the pitch characteristic curve is a pitch characteristic curve which is dependent on the air density at the location and at which the blade angle has a minimum as a function of the air density at the location in the region of a reference density, which applies to the location, of an atmosphere at the location, in particular of an atmosphere at a location which is characterized by a cold climate.

The reference density of an atmosphere at the location is preferably a standard density of a standard atmosphere or a "cold climate" air density of a location which is characterized by a cold climate, preferably a reference density ($\rho 0$) with a density ($\rho$) above or of 1.3 kg/m³.

Generally, the wind turbine, in particular a blade of the wind turbine, is advantageously configured to a specific air density at the location as a reference density. However, a location also experiences a bandwidth of air density around the reference density, especially owing to temperature fluctuations. The reference density can therefore be, for example, an average air density at the location. The region of the minimum at the reference density of the atmosphere at the location advantageously comprises an air density which deviates by +/−10%, in particular +/−5%, from the reference density. If the reference density at the location is the standard density of a standard atmosphere, the region of the minimum at the standard density of the standard atmosphere comprises an air density which deviates by +/−10%, in particular +/−5% from the standard density. A "cold climate" air density of a location which is characterized by a cold climate can serve as a reference density, preferably a reference density with a density above or of 1.3 kg/m³.

As a result, provided is, in a very simplified form, the use of a definition of an improved operational control system which is adapted to the air density of the location, in particular pitch characteristic curves, rated rotational speeds and/or power characteristic curves or torque characteristic curves. The description herein is based on the concept that average air densities which are significantly above the standard air density, or significantly above the general reference density, can only actually occur at relatively few locations. Even in wind turbines at such locations, the time periods at which the wind turbines are subjected to air densities which lie once more above these increased average air densities owing to relatively low ambient temperatures are limited when considered over the year.

According to the concept it is possible, in particular, to determine that according to the prior art a wind turbine is upgraded with respect to the tower clearance for situations to which it is actually subjected only during a fraction of its operating time. Where, in gother words, the tower clearance is greater at, for example, a standard density than it needs to be since the wind turbine is configured and operated in such a way that even for air densities $\rho$ which are greater than the standard density $\rho\_norm=1.225$ kg/m³ or are generally the reference density $\rho 0$, there is still sufficient tower clearance with loads and blade deflections which are then larger.

The realization lies in operating the wind turbine in such a way that it only has as much tower clearance as necessary for air densities which are greater than or equal to the standard air density $\rho\_norm=1.225$ kg/m³ or slightly below it, such as for example 5% below $\rho\_norm$ or generally greater than or equal to the reference density $\rho 0$ or slightly below it, such as for example 5% below the reference density ρ0. Specifically, according to this realization the blade deflection can be controlled by means of the blade angle.

The thrust on a rotor blade and therefore the deflection thereof can be reduced by means of a relatively large blade angle (α). The configuration of the rotor blade and the pitch control would therefore be matched to one another at a standard density or general reference density, in such a way that a minimum tower clearance then occurs. In such a procedure, accordingly smaller blade angles occur at a standard density ρ_norm, or general reference density ρ0, than according to the prior art.

The pitching of a rotor blade or of the rotor blades is therefore to be adapted to the air density, i.e., the blade angle to be set is a function of the output power level and/or of the torque and/or of the rotor speed and in addition of the air density (and not only as in the past a function of the output power level and/or the torque and/or of the rotor speed).

Implementation can be on rotationally-speed-variable, pitch-controlled wind turbines which provide determination of the air density (which are able to determine the air density by measuring the air pressure and the temperature and/or altitude of the location of the wind turbine) and which have the possibility of taking into account this value in the control of the blade angle. Within the scope of one development, this value can also be taken into account in the control of the rated rotational speed.

In order to take into account an air density at the location of the wind turbine, provided is a pitch characteristic curve which is a pitch characteristic curve which is dependent on the air density at the location.

According to the pitch characteristic curve the blade angle has a minimum as a function of the air density at the location in the region of a reference density, which applies to the location, of an atmosphere at the location, in particular of an atmosphere at a location which is characterized by a cold climate.

At relatively small blade angles, in most cases more power can be extracted from the wind within the scope of the development, and energy production is increased in comparison with the previous procedure according to the prior art by the procedure. The purpose herein is inter alia also to provide a basis for increasing the annual energy production values of a pitch-controlled rotational-speed-variable wind turbine by using pitch characteristic curves which are adapted to the air density of the location and/or rated rotational speeds, at any rate within the scope of the development.

Provided are a device and a wind turbine.

The device is designed to perform open-loop and/or closed-loop control of a wind turbine an aerodynamic rotor with rotor blades which are adjustable in the blade angle thereof, wherein the rotor can be operated with a variable rotor speed, and with a generator which is coupled to the aerodynamic rotor. The device has an operational control system which is designed to carry out the method, wherein the operational control system is designed to specify an air density at the location of the wind turbine and to set each blade angle of the adjustable rotor blades as a function of an output power level and/or a torque and/or of the rotor speed.

There is provision that
the operational control system has a pitch characteristic curve, and the blade angle is set while specifying, in particular as a function of, at least the pitch characteristic curve, which specifies the blade angle as a function of the output power, of the torque and/or of the rotor speed and as a function of the air density, wherein in order to take into account an air density at the location of the wind turbine, the pitch characteristic curve is a pitch characteristic curve which is dependent on the air density at the location, and the blade angle of the pitch characteristic curve has a minimum as a function of the air density in the region of a reference density, which applies to the location, of an atmosphere at the location, in particular of an atmosphere at a location which is characterized by a cold climate.

The wind turbine, in particular at a location which is characterized by a cold climate and has an air density, has an aerodynamic rotor with rotor blades which are adjustable in the blade angle thereof, wherein the rotor can be operated with a variable rotor speed, and a generator which is coupled to the aerodynamic rotor.

The wind turbine is characterized by the device for performing open-loop and/or closed-loop control and/or designed to carry out the method.

The reference density (ρ0) of an atmosphere at the location is preferably a standard density (ρ_norm) of a standard atmosphere or a "cold climate" air density of a location which is characterized by a cold climate, preferably a reference density (ρ0) with a density (ρ) above or of 1.3 kg/m$^3$.

A location of the wind turbine which is characterized by a cold climate is, in particular, a location whose average temperature is below 0° C. over the year, in particular below −15° C., and/or whose minimum temperature over the year lies in a region below −15° C., in particular below −20° C., and/or a reference density (ρ0) with a density (ρ) above or of 1.3 kg/m$^3$ can be assumed.

Within the scope of one development, the function of the pitch characteristic curve is produced in advance on the basis of theoretical considerations and stored in the operational control system of the wind turbine.

The air pressure and/or the temperature and/or air humidity and, if appropriate, additionally or alternatively also an altitude of a location can also be measured at the wind turbine. The air density can be advantageously calculated therefrom or the air density can be measured directly so that the blade angle can be determined using the stored function. There is preferably provision that ambient variables which are relevant for the wind turbine, comprising at least the air density and/or temperature and/or air humidity which are relevant for the wind turbine and, if appropriate, additionally or alternatively also an altitude of the location are acquired. In particular, in order to acquire the air density, an air pressure and an air temperature and/or an air humidity and, if appropriate, additionally or alternatively an altitude of the location are measured as further ambient relevant variables in the surroundings of the wind turbine and the air density is determined therefrom.

The deflection or the tower clearance are advantageously measured in operation, and the blade angle is set on the basis of these measured values in such a way that sufficient tower clearance is always ensured. A tower clearance and/or a blade deflection is advantageously defined at the reference density of an atmosphere at the location. In particular there is provision that a horizontal distance in the region of a blade tip and/or a blade deflection of the rotor blade with respect to a tower is defined or measured when the tower is passed by the rotor blade of the wind turbine, wherein the minimum of the blade angle is defined in such a way that the tower clearance is minimal. A basic illustration of this particularly preferred relationship is shown in FIG. 6. In particular the following is apparent therein.

There is preferably provision that a tower clearance at a standard density of a standard atmosphere, or general reference density of an atmosphere at the location, is minimal at the local minimum of the blade angle, wherein the pitch characteristic curve $(K\alpha,\rho)$ which is dependent on the air density has such a progression that the minimum tower clearance is maintained when the blade angle is set while predefining at least the pitch characteristic curve.

There is preferably also provision that the pitch characteristic curve which is dependent on the air density has such a progression that when the blade angle is set a minimum tower clearance is largely maintained or remains constant while predefining at least the pitch characteristic curve at least for an, at least over the reference density of an atmosphere at the location, in particular standard density of a standard atmosphere, increased air density, in comparison with a linearly decreasing minimum tower clearance as a function of the air density for an identical increased air density. With the measures of the concept herein is it additionally or alternatively also possible to reduce a tower clearance for a reduced air density in comparison with a linearly decreasing minimum tower clearance as a function of the air density for an identical reduced air density.

A blade angle is preferably lowered and/or a rotational speed raised in the case of rated operation in the region of a reference density, which applies to the location, of an atmosphere at the location.

In particular there is provision that with a blade angle at the standard density at the standard atmosphere, or general reference density of an atmosphere at the location, a rated rotational speed (n_N) during rated operation is raised with respect to a rotational speed which is provided with a relatively large blade angle, according to the pitch characteristic curve which is dependent on the air density.

There is preferably provision that a rated rotational speed (n_N) in the case of rated operation is raised in the region between a rotational speed at a first blade angle $(\alpha>(\rho>)$ of an air density $(\rho>)$ which is increased above the standard atmosphere and a rotational speed at a second blade angle $(\alpha<(\rho<)$ of an air density $(\rho<)$ which is reduced with respect to the standard atmosphere; in particular in the region of the minimum $(\alpha 0)$ of the pitch angle, specifically in the region of a reference density $(\rho 0)$, which applies to the location, of an atmosphere at the location which comprises, in particular, an air density which deviates by +/−10%, in particular +/−5%, from the reference density, in particular standard density.

In fact, at least partially instead of the lowering of the blade angle at a standard air density, or generally at a reference density, or in combination with lowering of the blade angle, it is advantageously also possible to provide for the rated rotational speed also to be raised with respect to the operation under "cold climate" conditions. Such raising of the rated rotational speed can have qualitatively the same effects as described for pitching.

It is also possible to provide a combination of lowering of the blade angle and raising of the rated rotational speed. However, in every case the wind turbine could be operated with different settings in terms of the blade angle and/or the rated rotational speed at standard air density $\rho=1.225$ kg/m³, or generally at reference density, than under "cold climate" conditions, preferably with densities $\rho>=1.3$ kg/m³.

For example, the concept herein advantageously offers, within the scope of a first development, the possibility of maintaining or increasing the annual production of energy in wind turbines at locations with an at any rate lower or variably fluctuating density, by using a changed operational control system, preferably by means of a changed operating characteristic curve.

In order to compensate the wind power level which is available at the specified minimum of the pitch characteristic curve at a low density, one development provides, in particular, to operate the wind turbines with a relatively high rated rotational speed, at any rate at a density which is lower in comparison with the standard density, or general reference density of an atmosphere at the location, at the location of the wind turbine. In order to make full use of the wind power which is available at the minimum at a low density, one development provides, in particular, for the wind turbines to be operated with a relatively high rated rotational speed.

The development is based on the concept that the operational control system can be adapted as a function of the air density which is relevant for the wind turbine. According to the concept of the development, this should lead to a situation in which the adapted rotational speed of the rotor is selected to generate a preferably optimized electrical power which is to be output by the generator. This means that in the case of an air density which is relevant to the wind turbine and is comparatively reduced—at any rate within the region of a blade angle, by the local minimum, the adapted rated rotational speed is increased with respect to a (rated) rotational speed relating to a standard density of a standard atmosphere or generally relating to a reference density of an atmosphere at the location.

Generally, within the scope of the development, basically for the case in which the air density is an air density which is reduced or increased with respect to a reference density, a corrected rotational speed in the region around the reference density $\rho 0$ between a density $\rho<$ and a density $\rho>$ with a blade angle $\alpha<$ or $\alpha>$ is a rotational speed which is increased with respect to the rotational speed for the atmosphere at the location.

Within the scope herein, in particular for the case in which the air density is an air density which is reduced or increased with respect to a standard density, a corrected rotational speed can be a rotational speed which is increased with respect to the rotational speed for the standard atmosphere in the region around the standard density between a density $\rho<$ and a density $\rho>$ with a blade angle $\alpha<$ or $\alpha>$.

Therefore, within the scope of this development a rotational speed of the rotor of the wind turbine can be increased as a function of the air temperature and/or air density using the reduced air density, which is relevant for the wind turbine. The wind turbine can for this purpose be open-loop and/or closed-loop controlled according to the pitch characteristic curve. For example, a power level, in particular rated power level, can advantageously be increased and the power level which is guaranteed to be output can be ensured, for example in accordance with an annual energy production (AEP) value.

This advantageously means that the wind turbine can be set overall to generate the power which is to be output by setting the generator, by setting an exciter current, preferably the generator rotor, by setting one or more rotor blades and/or one or more flow elements at a rotor blade, by setting an azimuth position of the nacelle of the wind turbine.

It has proven advantageous overall within the scope of the development that the rotational speed is influenced and/or set by actuating the blade angle of a component on the rotor, in particular a blade angle of a rotor blade according to a pitch characteristic curve according to the concept herein while specifying the electrical power to be output and the air density.

There is preferably provision that the blade angle on the pitch characteristic curve which is dependent on the air density rises starting from the reference density of the atmosphere at the location as the air density decreases and the air density increases.

There is preferably provision that the minimum of the pitch characteristic curve is a local minimum in the mathematical sense, in particular is smallest at the local minimum of the blade angles ($\alpha(\rho 0)$) in comparison with the first blade angle ($\alpha>(\rho>)$ at an air density ($\rho>$) which is slightly increased with respect to the reference density, and in comparison with a second blade angle ($\alpha<(\rho<)$ at an air density ($\rho<$) which is slightly reduced in comparison with the reference density.

The minimum can preferably be a global minimum in the mathematical sense, wherein at the global minimum the blade angle ($\alpha(\rho 0)$) is the absolutely smallest blade angle of the entire pitch characteristic curve ($K\alpha$).

There is preferably provision that the air density is a current air density at the location of the wind turbine, in particular an air density which is adapted in a transient fashion or repeatedly at intervals, preferably the adapted air density at the location is measured in a transient fashion or repeatedly at predetermined intervals. There is preferably provision that the air density is the current air density at the location of the wind turbine, wherein the setting of the blade angle is adapted dynamically in accordance with the pitch characteristic curve which is dependent on the air density.

There can also advantageously be provision that the air density is a location-related, generally prevailing air density, in particular a variable but permanently predefined air density, relevant for the location and is determined once or repeatedly, which is preferably predefined as an average air density at the location. The air density is preferably the location-related air density which prevails generally, wherein the setting of the blade angle is adapted statically in accordance with the pitch characteristic curve which is dependent on the air density.

There is preferably provision that the pitch characteristic curve is a part of a characteristic curve diagram in which, in order to take into account different air densities, a plurality of pitch characteristic curves corresponding to different reference densities ($\rho 0$) are stored and the pitch characteristic curve is selected from the stored pitch characteristic curves as a function of the acquired air density and is used to set the blade angle.

There can also be provision that in order to take into account different air densities, at the pitch characteristic curve corresponding to the reference density a stored pitch characteristic curve is scaled as a function of the acquired air density, in particular with a scaling factor of a ratio of the acquired air density to the reference density ($\rho 0$), and is used to set the blade angle.

Advantageously, it is also possible that in order to take into account different air densities at the pitch characteristic curve corresponding to the reference density, the pitch characteristic curve which indicates the blade angle as a function of the output power and/or the torque and/or the rotor speed and as a function of the air density, indicates as a function of the acquired current or prevailing air density, and is used to set the blade angle.

There is preferably provision that the progression of the minimum of the blade angle changes with the output power.

A basic illustration of this particularly preferred relationship is shown in FIG. 7. It is, in particular, clear therein that preferably the progression of the minimum of the blade angle has a flattened form at a relatively high power (P1) than at a relative low power (P3), and/or a region of the pitch characteristic curve of a lowered blade angle is larger around the minimum between an increased air density ($\rho>$) and a reduced air density ($\rho<$) at a higher power (P1) than at a lower power (P3).

There is preferably provision that the pitch characteristic curve specifies the blade angle which is to be set for the partial load operation and/or for a transition from a partial load operation into a rated load operation, wherein in the partial load operation the wind is so weak that the wind turbine cannot yet be operated with its maximum output power.

Embodiments will now be described below with reference to the drawing. The drawing is not necessarily intended to illustrate the embodiments to scale but rather the drawing is, where useful for the purpose of explanation, embodied in a schematic and/or slightly distorted form. Reference is made to the relevant prior art for additional information on the teachings which can be discerned immediately from the drawing. It is to be borne in mind here that a wide variety of modifications and changes relating to the form and the detail of an embodiment can be made without parting the general concept herein. The features herein which are disclosed in the description, in the drawing and in the claims can be essential both individually and in any desired combination to the development of the disclosure. In addition, all the combinations of at least two of the features which are disclosed in the description, the drawing and/or the claims are covered by the scope of the disclosure. The general concept of the disclosure is not limited to the precise form or the detail of the preferred embodiments which are shown and described below or limited to a subject matter which would be limited in comparison with the subject matter claimed in the claims. In specified dimensional ranges, values lying within the specified limits are intended also to be disclosed as limiting values and can be used and claimed as desired. For the sake of simplicity, identical reference signs are used below for identical or similar parts or parts with an identical or similar function.

BRIEF DESCRIPTION OF THE SEVERAL VIEWS OF THE DRAWINGS

Further advantages, features and details of the invention emerge from the following description of preferred embodiments and with reference to the drawing; in which.

DETAILED DESCRIPTION

Figure 1:
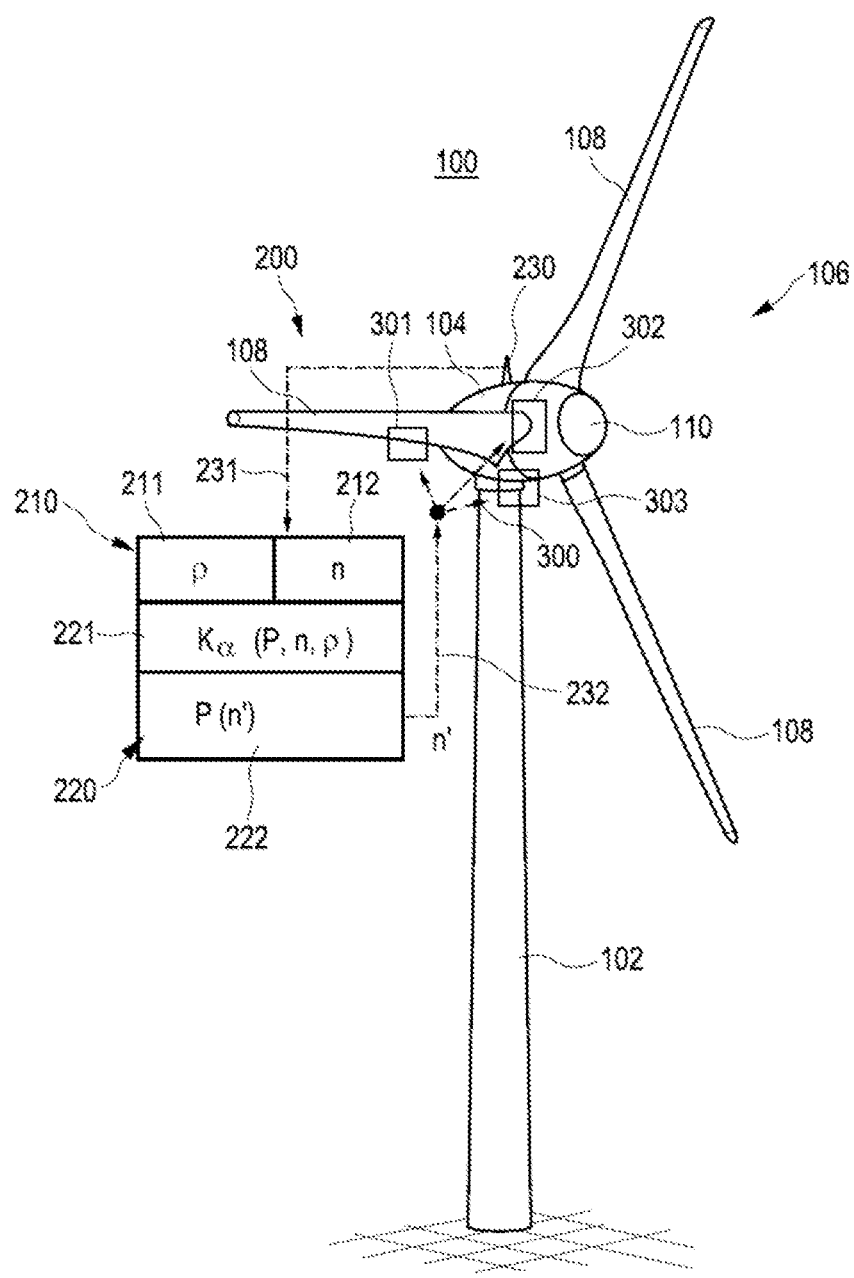
FIG. 1 shows a preferred embodiment of a wind turbine.

FIG. 1 shows as an example a preferred embodiment of a wind turbine 100 with a tower 102 and a nacelle 104. A rotor 106 with three rotor blades 108 and a spinner 110 is arranged on the nacelle 104. The rotor 106 is displaced by the wind into a rotational movement during operation and thereby drives a generator in the nacelle 104.

A wind turbine in FIG. 1 or any wind turbine of a wind park or else the wind park is equipped here with a device 200 for performing open-loop and/or closed-loop control (open-loop and closed-loop control device 200) as part of an operational control system with one or more regulators 220 which comprise here at least one power regulator 222. These regulators 220 control an actuating device 300 with a corresponding actuator system or actuating elements 301, 302, 303, for, as an example, a blade angle of a rotor blade or of the rotor blades according to a pitch characteristic curve and/or an exciter current of the generator in the nacelle and/or an azimuth angle of the nacelle of the wind turbine 100.

The open-loop and closed-loop control device 200 receives according to FIG. 1 measurement information from a sensor system 230 via a signal line 231 which approach a measuring module 210 of the open-loop and closed-loop control device 200. The sensor system 230 for the wind turbine acquires relevant ambient variables comprising at least the air density and/or temperature relevant to the wind turbine and/or an air pressure and an air temperature for the air density as further relevant ambient variables in the surroundings of the wind turbine, in order to determine the air density therefrom.

The sensor system 230 and/or this measuring module 210 therefore has at least one first determining unit 211 for determining a density, and the second determining unit 212 for determining the rotational speed n of a rotor of the wind turbine. Parameters such as the blade deflection can also be measured, for example, with a strain gauge and/or a tower clearance of the wind turbine can be measured with a distance sensor over the distance between the outer wall of the tower and a blade tip of the rotor blade.

Furthermore, in addition to the power regulator 222 here, a pilot control unit 221, e.g., a computing unit or the like with one or more stored operating characteristic curves comprising at least one air-density-dependent pitch characteristic curve Kα (P,n, ρ) with a pitch characteristic curve Kα,ρ which is dependent on the air density is provided here as part of the regulator 220, which pitch characteristic curve Kα (P, n, ρ) is able, in particular, to predefine an adapted rotational speed n in accordance with a density-adapted operating characteristic curve diagram Kα (P, n, ρ) for the power regulator 222 here.

The rotational speed n' which has been adapted and/or corrected in this way—that is to say a rotational speed n' which has been adapted from a rotational speed n to a rotational speed n' according to the pilot control unit 221 and which can additionally or alternatively be corrected according to a density-adapted power P, can be fed via a further signal line 232 to the wind turbine 100 and the corresponding actuating device 300 thereof.

As already mentioned at the beginning, power calculations for a wind turbine are currently carried out with the assumption of a standard atmosphere. The standard density ρ_norm which is used here for the reference density ρ0 is ρ_norm=1.225 kg/m$^3$. At any rate at locations at a high altitude and/or under "cold climate" conditions with on average relatively low temperatures this assumption is, however, no longer quantitatively correct and deviations in the density of up to 30% from the design conditions based on the standard density ρ_norm used can certainly occur. In contrast to the prior art there is provision that the pitch characteristic curve is a pitch characteristic curve Kα,ρ which is dependent on the air density, wherein the pitch characteristic curve has a local minimum α0 as a function of the air density at a standard density of a standard atmosphere. Basically there is provision that a minimum is provided in the region of a reference density ρ0 of an atmosphere at the location which applies to the location, which is intended to correspond here in this exemplary embodiment to the standard density ρ_norm of a standard atmosphere, but can generally be a reference density ρ0 as a "cold climate" air density (that is to say, for example, a reference density ρ0 where ρ>=1.3 kg/m$^3$).

Figure 2:
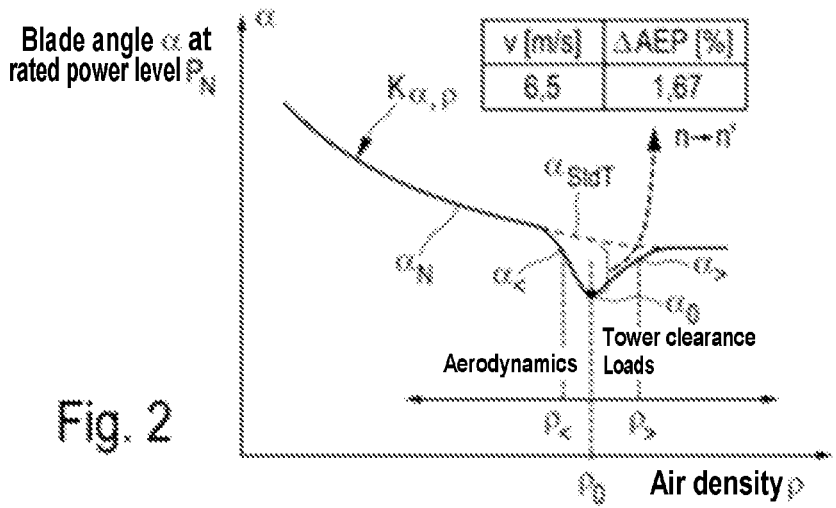
FIG. 2 shows a preferred embodiment of an aspect of a pitch characteristic curve (relationship between the blade angle (pitch angle) and power), wherein the pitch characteristic curve at a constant power as a function of the air density at a reference density $\rho 0$, which is intended to correspond here to the standard density $\rho\_norm$ of a standard atmosphere, can in general however be a reference density $\rho 0$ as "cold climate" air density (that is to say, for example, a reference density $\rho 0$ where $\rho>=1.3$ kg/m$^3$) has a global minimum ($\alpha 0$) here.
Figure 4:
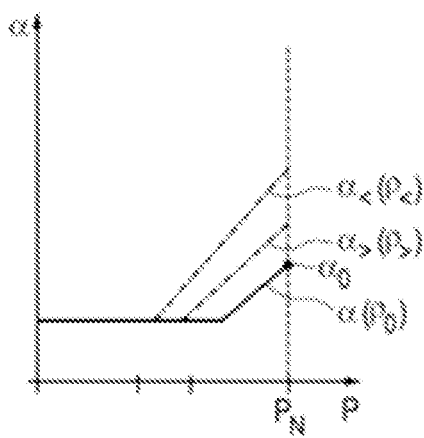
FIG. 4 shows three pitch characteristic curves which are illustrated by way of example as a typical relationship between a blade angle (pitch angle) and power level at different densities.
Figure 5:
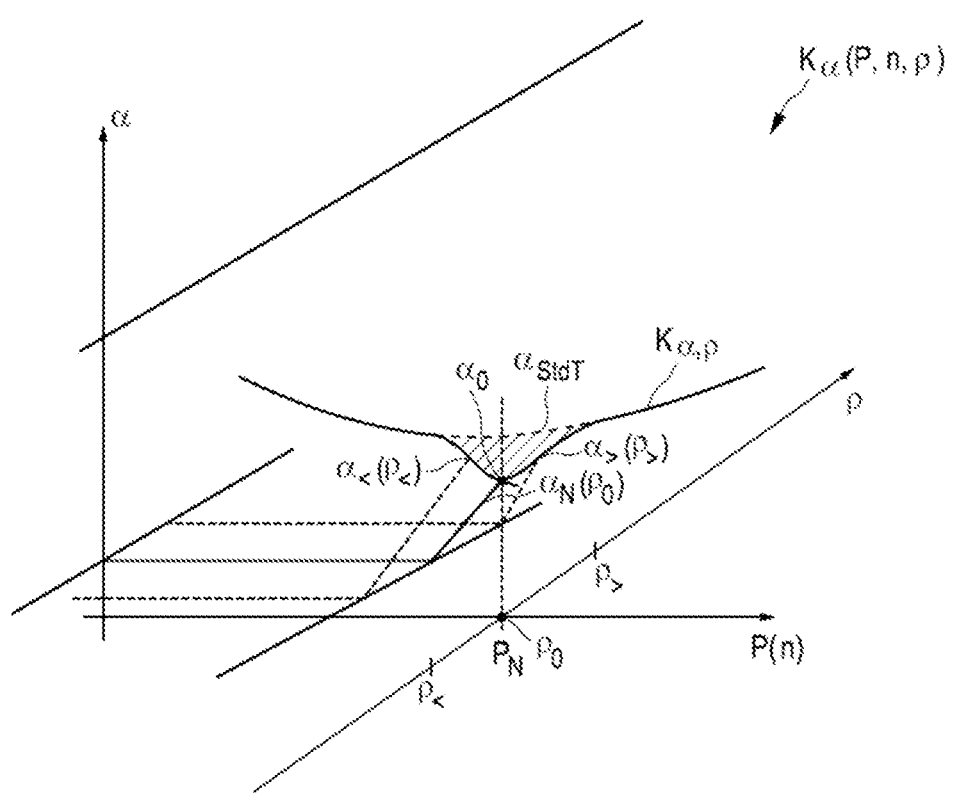
FIG. 5 shows a preferred embodiment of a pitch characteristic curve diagram comprising a multiplicity of pitch characteristic curves taking into account the aspect that the pitch characteristic curves (relationship between the blade angle (pitch angle) and power) as a function of the air density at a reference density ρ0—which is intended to correspond here to the standard density ρ_norm of a standard atmosphere but can generally be a reference density ρ0 as "cold climate" air density (that is to say, for example, a reference density ρ0 where ρ>=1.3 kg/m$^3$)—have a global minimum (α0) here.

FIG. 2 shows in this exemplary embodiment a pitch characteristic curve Kα,ρ which is dependent on the air density, here as part of a characteristic curve diagram Kα (P, n, ρ) which is mentioned with respect to FIG. 1 and is also explained with respect to FIG. 5. The characteristic curve diagram Kα (P, n, ρ) which specifies the blade angle as a function of output power and/or of the torque and/or of the rotor speed, serves especially for setting a blade angle α of a wind turbine 100 in FIG. 1 while predefining this air-density-dependent pitch characteristic curve Kα,ρ. In order to take into account the different air densities at a location which is characterized by a cold climate, the wind turbine 100 has implemented precisely this pitch characteristic curve Kα,ρ, dependent on the air density, in its operational control system. The pitch characteristic curve Kα,ρ is specified here by way of example as part of a characteristic curve diagram Kα (P, n, ρ) whose details are also explained in FIG. 3 and FIG. 4.

The reference density ρ0 of an atmosphere at the location is preferably a standard density of a standard atmosphere or the reference density ρ0 at a location which is characterized by a cold climate can be a "cold climate" air density.

Generally, the wind turbine, in particular a blade of the wind turbine, is configured for a specific air density at the location, specifically the reference density. However, a location also experiences a bandwidth of air densities around the reference density, especially owing to temperature fluctuations. The reference density can be, for example, an average air density at the location. For example, the region of the minimum at the reference density of the atmosphere at the location comprises an air density which deviates by +/−10%, in particular by +/−5% from the reference density. If the reference density at the location is the standard density of a standard atmosphere, the region of the minimum at the standard density of the standard atmosphere comprises an air density which deviates by +/−10%, in particular +/−5%, from the standard density.

In the present case of exemplary embodiments, for the sake of simplicity, it is assumed that the reference density ρ0 of the density corresponds to "cold climate" conditions. That is to say at a location of the wind turbine which is characterized by a cold climate. For example, the average temperature of said location lies below 0° C. over the year, in particular below −15° C. and/or its minimum temperature over the year lies in a range below −15° C., in particular below −20° C. For example, a reference density ρ0 where ρ>=1.3 kg/m³ can occur at a location of the wind turbine which is characterized by a cold climate.

The statements as explained below for a standard density ρ_norm apply generally to a reference density ρ0, wherein reference is made to the reference density ρ0 in the figures.

Firstly, referring to FIG. 2, said figure shows a pitch characteristic curve Kα,ρ which is plotted at a constant power, here at the rated power, is dependent on the air density and has a progression as a function of the air density, which progression has a local minimum α0 at a reference density ρ0 (here, for example, corresponding to a standard density of a standard atmosphere). The pitch characteristic curve Kα,ρ which is dependent on the air density shows in this respect a blade angle α which is relevant during partial load operation, as a function of the air density ρ, which blade angle α is also relevant at the transition from the partial load operation into the rated load operation, and wherein α0 shows said blade angle α at a standard density ρ_norm, that is to say 1.225 kg/m³, or, for example, generally at a reference density ρ0 (e.g., a "cold climate" air density where, for example, ρ>=1.3 kg/m³) at a location of the wind turbine which is characterized by a cold climate.

The local minimum of the blade angles is distinguished by the fact that the blade angle α0 at a reference density ρ0 is smallest in comparison with a first blade angle α> and also in comparison with a second blade angle α<. The blade angle α> is here that blade angle α at the rated power P_N which is provided at an air density ρ> which is slightly increased with respect to the standard atmosphere, and the second blade angle α< is that blade angle which is provided at an air density ρ< which is slightly reduced in comparison with the standard atmosphere, at a rated power P_N.

The first and the second blade angles α>, α< is shown here by way of example. That is to say specifically the progression of the pitch characteristic curve Kα,ρ which is dependent on the air density ensues such that the blade angle α, at the rated power P_N on the pitch characteristic curve Kα,ρ which is dependent on the air density, rises starting from a reference density ρ0 with a decreasing and with an increasing air density ρ, that is to say the blade angle α rises from α0 to α< in the direction of relatively low densities (in comparison with the reference density ρ0) and to α> in the direction of relatively high densities (in comparison with the reference density ρ0).

This is at any rate the case for relatively low and relatively high air densities ρ<, ρ>. A changed air density ρ<, ρ>, is considered here generally to be an air density in the range from 5% up to, under certain circumstances, 10% which deviates from the standard density ρ_norm (or for example generally an air density which deviates from the reference density ρ0 (e.g., where ρ=1.3 kg/m³) at a location of the wind turbine which is characterized by a cold climate).

The pitch characteristic curve Kα,ρ which is dependent on the air density is shown here in a continuous line in FIG. 2, in comparison with a pitch characteristic curve Kα which is illustrated by a dashed line, according to the prior art. The progression of the customary pitch characteristic curve Kα in the region of the standard density and in the rest of the region outside the standard density is continuously monotonously falling. That is to say a blade angle α_StdT according to the prior art has the progression of a local minimum neither at a reference density ρ0 (e.g., standard density ρ_norm or "cold climate" air density such as, e.g., ρ>=1.3 kg/m³ or the like) nor in the range between ρ< and ρ> but rather is also monotonously falling toward relatively high air densities.

A location of a wind turbine which is characterized by a cold climate is understood here to be a location which in the exemplary embodiment has an average temperature over the year of 0° C. and/or its minimum temperature over the year lies in a region below −20°, and with a "cold climate" air density where, for example, ρ>=1.3 kg/m³. At such a location the dependence of an air density which is customary according to the prior art as a continuous strictly monotonously falling function, with, under certain circumstances, a blade angle which is kept constant starting from the reference density, in particular standard air density, with rising densities, is disadvantageous with respect to the following problems.

On the one hand, it is therefore the case that at air densities below the reference density ρ0, that is to say at an air density ρ<, the tendency of flow separations at the rotor blade rises owing to the decreasing air temperature. This this is counteracted by α0 starting with an increased blade angle for low air densities ρ<.

Furthermore, it has been realized that for air densities above the reference density ρ0 with increasing air densities ρ> the loads on the rotor blade rise and in this respect there is a risk of excessive blade deflection, possibly toward a small tower clearance, owing to the increased air density. This is counteracted with a blade angle which rises starting from the reference density ρ0. That is to say according to the pitch characteristic curve Kα,ρ which is dependent on the air density, the rotor blade is set with an increasing air density, starting from the local minimum at (ρ0, α0) with a blade angle which increases at any rate up to a value ρ>. That is to say the rotor blade is moved in the direction of a feathered position owing to the initially increasing blade angle between α0 and α> starting from the local minimum.

This behavior which is provided, according to the pitch characteristic curve Kα,ρ which is dependent on the air density, therefore counteracts, on the one hand, a flow separation at the rotor blade at air densities below the reference data ρ0, and on the other hand, loads are limited for air densities above the reference density ρ0 and ensure sufficient tower clearance.

Furthermore, the concept herein has realized that with such a measure of an air-density-dependent pitch characteristic curve Kα,ρ with a local minimum at (ρ0, α0) there is the possibility of a gain in production of energy with blade angles α0 which are reduced in such a way, in comparison with a blade angle according to the prior art α_StdT.

FIG. 2 shows a computational example at an average wind speed of 6.5 m/s. This would bring about an annual gain in production of energy of 1.67%, according to a comparison calculation, owing to this measure.

The concept herein therefore offers, within the scope of a further adaptation according to demand, not only aerodynamic advantages and a reduction in load on the rotor blade, but furthermore also a gain in production of energy which is achieved in this combination by the pitch characteristic curve with is dependent on the air density, with a local minimum at (α0, ρ0) in the region of the reference density ρ0 (that is to say generally a density such as, e.g., where ρ>=1.3 kg/m³ at a location of the wind turbine which is characterized by a cold climate or as, e.g., a standard density ρ_norm).

The concept herein is explained here within the scope of such a pitch characteristic curve Kα,ρ which can be complied with as a dependent characteristic curve for controlling the wind turbine according to FIG. 1. It is nevertheless possible to predefine this pitch characteristic curve as a pilot control, in order then to continue to perform open-loop and/or closed-loop control of the wind turbine on the basis of this pitch characteristic curve.

Figure 3:
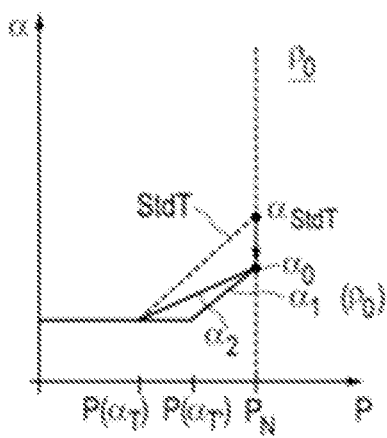
FIG. 3 shows two pitch characteristic curves which are illustrated by way of example as a typical relationship between a blade angle (pitch angle) and power in comparison with a pitch characteristic curve according to the prior art at a standard density.

FIG. 3 shows in this respect, for example for a method for adapting a blade angle, the progression of a pitch characteristic curve Kα. Here, pre-pitching with increasing power P from the partial load region occurs below P_N to the rated load region at and above P_N. In this context, the minimum blade angle αT of the partial load region is increased starting from a specific power P(αT) or P(αT') up to a blade angle α_StdT at the rated load P_N at the reference density ρ0 which is assumed here by way of example.

In the present embodiment here there is provision that, as characterized by the arrow in FIG. 3, the value of the blade angle α_StdT is decreased to a value α0 at the reference density ρ0 (that is to say generally a density such as, e.g., where ρ>=1.3 kg/m³ at a location at the wind turbine which is characterized by a cold climate or as, e.g., a standard density ρ_norm, as has been explained at the start of FIG. 2).

Furthermore, the same can also be provided in a range between ρ< and ρ>, that is to say with blade angles α< and α> in a region around the reference density ρ0. The progression of the pre-pitch process can also occur starting from an αT or some other angle αT' in such a way that either the threshold value of the power is changed to an increased threshold value P(αT') (progression of α_1) or else the positive gradient starting from the first threshold value P(αT) is lower (progression α_2); a combination of these measures is also possible.

In both cases, the progression of the pitch characteristic curve, that is to say the adaptation of the blade angle as a function of the power of the wind turbine P, ends such that at the rated load P_N the blade angle α0 which is present at the standard density lies below that of the prior art α_StdT owing to the local minimum of the air-density-dependent pitch characteristic curve.

FIG. 4 shows in this respect a family of characteristic curves Kα,ρ, that is to say progressions of blade angles α as in FIG. 2, for example, also as progressions of blade angles α< and α> at the densities which deviate from the reference density ρ0 (e.g., a density such as, e.g., where ρ=1.3 kg/m³ at a location of the wind turbine which is characterized by a cold climate or as, e.g., a standard density ρ_norm), i.e., a lower density ρ< and higher density ρ>, in order to clarify prepitching from the partial load region at a power P below the rated power P_N. Therefore, the progression a provides the progression already given in FIG. 3, as a function of the power. The same also applies to the progressions α< and α> at the locations α< and α> characterized in FIG. 2.

FIG. 5 shows schematically in combination a characteristic curve diagram Kα (P, n, ρ), wherein the pitch characteristic curve Kα,ρ shown in FIG. 2 is part of this characteristic curve diagram Kα (P, n, ρ). The characteristic curve Kα,ρ shown in FIG. 5 at a constant rated power P_N corresponds to the pitch characteristic curve Kα,ρ illustrated in FIG. 2.

Furthermore, the characteristic curve diagram Kα (P, n, ρ) generally comprises characteristic curves Kα,ρ not only for a reference density ρ0 but also for densities ρ< and ρ> above and below that, with corresponding progressions α< and α> which are plotted by way of example in FIG. 5 for the characteristic curve diagram Kα (P, n, ρ).

In all the cases between a lower and a higher density α< and ρ> which can be seen in the hatched area of the characteristic curve diagram, the rated rotational speed in this respect can generally be increased and/or at the transition from a partial load region into the rated load region, which can be beneficial for the increase in energy production at rated load or also in the region above it. Increasing the rated rotational speed in a region below the reference density ρ0 is basically advantageous.

Increasing the rated rotational speed however also proves possible in a region above the reference density ρ0 by taking into account the boundary conditions relating to a tower clearance TF. Therefore, an increase in the rated rotational speed in the hatched area of the characteristic curve diagram, that is to say generally in the region of a lowered blade angle on the pitch characteristic curve which is dependent on the air density (here at any rate between ρ< and ρ> with corresponding values α< and α>) should occur, in particular, with the measures that the rated rotational speed is basically a strictly monotonously falling function in accordance with an increasing density.

It is basically possible to treat such a characteristic curve diagram in a variety of ways. The operational control system of a wind turbine preferably has for this purpose a rotational speed/power operational characteristic curve (n/P operational characteristic curve), wherein in a first exemplary case the adapted operational characteristic curve is predefined as a function of the air density which is relevant for the wind turbine, by means of the air-density-dependent pitch characteristic curve Kα,ρ which is illustrated here. Then, the wind turbine is operated to generate the power which is to be output on the basis of the adapted rotational speed/power operational characteristic curve (n/P operational characteristic curve) in the operational control system. In one variant, the wind turbine can be operated to generate power on the basis of an adapted rotational speed/torque operational characteristic curve in the operational control system.

In both variants a predefined, adapted current rotational speed n can be predefined in the operational control system and then set by means of an open-loop and/or closed-loop control system. In particular, the increase, illustrated here, in rotational speed is proposed in the range between ρ<, ρ> and α< and α>; at any rate for partial load operation and the transition to rated load.

In a modified procedure, in a second exemplary case firstly the rotational speed of the rotor can be set or predefined taking into account a predetermined reference density ρ0, that is to say, e.g., a density such as, e.g., where ρ=1.3 kg/m³ at a location of the wind turbine which is characterized by a cold climate or as, e.g., a standard density ρ_norm of a standard atmosphere, and the adapted rotational speed can subsequently be predefined taking into account the air density which is relevant for the wind turbine, if appropriate also an air temperature. This can be done according to the aspect of an air density dependence of a pitch characteristic curve (relationship between the power and blade angle or between the torque and blade angle in one variant) Kα,ρ; that is to say for possibly dynamically changing air densities ρ< or ρ>.

In both specified first and second cases, the wind turbine can therefore be set to generate power which is to be output (or torque in one variant) by predefining the adapted rotational speed n', which can at any rate be adapted, specifically increased, from n auf n' in the region of the minimum of the blade angle. The wind turbine can be operated with rotational speed control in the partial load region and/or rated load region.

This can be done, in particular in the rated load region, under certain circumstances by additionally or alternatively setting the generator by setting an exciter current, preferably the generator rotor. This can be additionally or alternatively done by setting one or more rotor blades corresponding to the explained predefined values of a pitch characteristic curve for setting a blade angle. Additionally or alternatively it is also possible to set an azimuth angle for the nacelle of the wind turbine.

Figure 8:
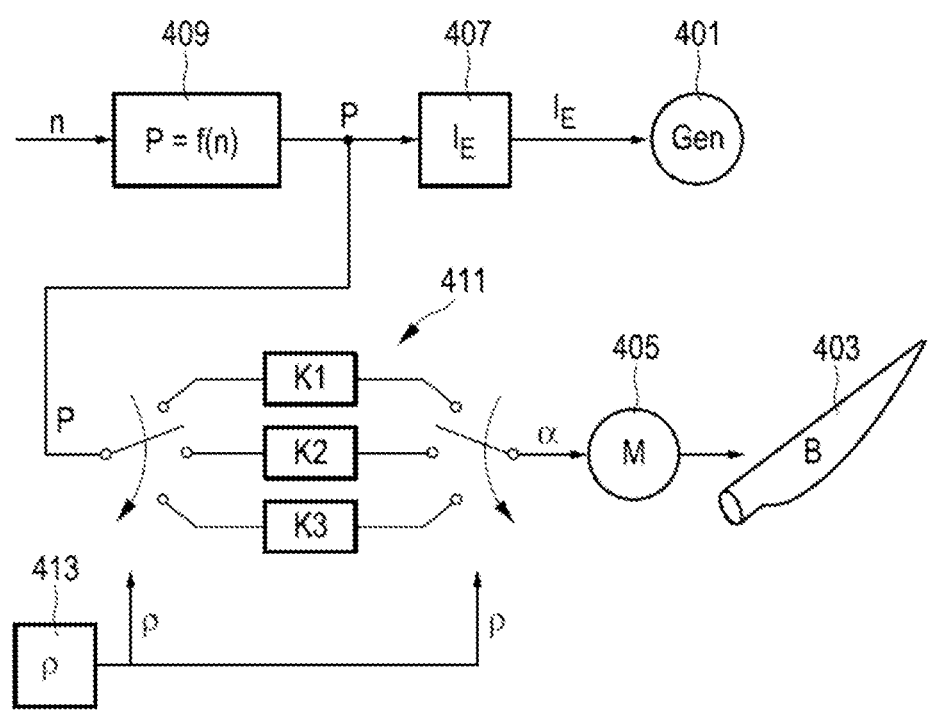
FIG. 8 shows a preferred embodiment of an open-loop and closed-loop control device in a simplified structure for carrying out setting of a blade angle during partial load operation up to the rated load, as a function of the output power, and if appropriate rotational speed, and the acquired air density.

With respect to FIG. 8, the open-loop and closed-loop control of a wind turbine is specifically explained further by way of example within the scope of a particularly preferred embodiment using the example of a family of air-density-dependent pitch characteristic curves Kα,β, which are referred to in FIG. 8 as K1, K2, K3 and are to be considered part of a characteristic curve diagram Kα (P, n, ρ).

Figure 6:
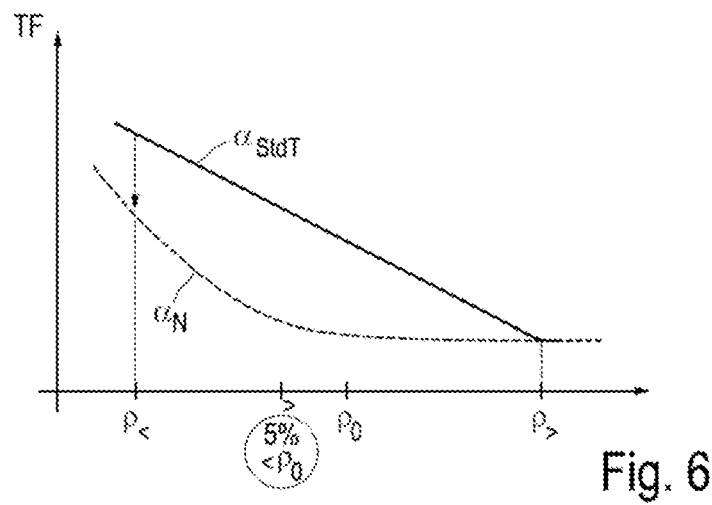
FIG. 6 shows a comparison of a tower clearance (TF) which is illustrated schematically and by way of example, with the illustration of a reduced tower clearance at relatively low densities and an essentially constantly low tower clearance even at relatively high densities according to a pitch characteristic curve.

FIG. 6 shows a tower clearance TF, illustrated symbolically and by way of example, within the scope of a comparison. In the prior art, a tower clearance TF will normally not be constant at a value ρ> but rather decrease further and ideally only reach its minimum at an extremely high density value of ρ=1.3 kg/m³. In comparison therefore with a tower clearance for a pitch characteristic curve α_StdT according to the prior art, as illustrated in FIG. 6, a reduced tower clearance can at any rate already be set at relatively low densities; this is indicated below by means of an arrow at a density ρ<. The progression of the tower clearance TF leads to a low, preferably minimum value, with increasing density just before the reference density ρ0, in particular a standard density ρ_norm or possibly a density such as, e.g., where ρ>=1.3 kg/m³ at a location of the wind turbine which is characterized by a cold climate, here for example in a region of 5% below the reference density ρ0. In this embodiment, the progression of the tower clearance TF also leads at relatively high densities ρ> to an essentially constant low tower clearance, even at the relatively high densities according to a pitch characteristic curve. Accordingly, there is preferably also provision that the pitch characteristic curve which is dependent on the air density has such a progression that the minimum tower clearance when the blade angle is set is maintained by predefining at least the pitch characteristic curve at least for an increased air density. With the measures it is additionally or alternatively also possible to decrease a tower clearance for reduced air density.

Figure 7:
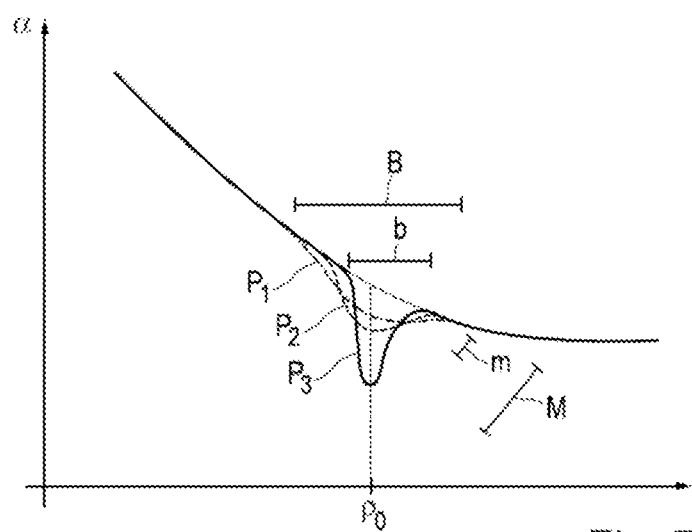
FIG. 7 shows a family of pitch characteristic curves for different powers, wherein the minimum is all the more pronounced the lower the power.

FIG. 7 shows a family of pitch characteristic curves for different powers P1, P2 and P3. FIG. 7 is intended to clarify in a schematic form, by means of a basic progression of the three pitch characteristic curves shown for different powers P1, P2 and P3, that the potential for a rated rotational speed increase and/or rated power increase is greater in the region of a reduction in the blade angle. In particular, this can be provided to an advantageously balanced extent, preferably in such a way that the rated rotational speed and/or rated power are/is increased to the same extent. This is at any rate possible for densities below the reference density ρ0. An increase in the rated rotational speed in a region below the reference density ρ0 is basically advantageous. An increase in the rated rotational speed proves, as explained above, possible in a region above the reference density ρ0 taking into account the boundary conditions relating to a tower clearance TF. Therefore, an increase in the rated rotational speed in the hatched region in FIG. 5 of the reduction in the blade angle below the upper, strictly monotonously falling pitch characteristic curve—that is to say generally in the region of a lowered blade angle on the pitch characteristic curve which is dependent on the air density can be carried out with the measure that the rated rotational speed is basically a strictly monotonously falling function in accordance with an increasing density.

It becomes apparent that the minimum α_0 of the blade angle is all the more pronounced the lower the power—this increases from P3 to P1. It can be seen that the density-dependent progression of the pitch characteristic curves for an average power P2 corresponds approximately to the density-dependent progression of the pitch characteristic curve in FIG. 2.

Accordingly there is also provision that the progression M of the blade angle is more pronounced around the minimum at a relatively low power P3 than the progression m of the blade angle around the minimum at a relatively high power P1. In other words, it can be stated that the progression m of the blade angle around the minimum at a relatively high power P1 (in particular the amplitude m of the reduction of the blade angle below the strictly monotonously falling function, indicated by dashed lines, at a relatively high power level P1) has a flatter form than the profile M of the blade angle around the minimum at a relatively low power level P3 (in particular the amplitude M of the reduction in the blade angle below the strictly monotonously falling function, indicated by dashed lines, at a relatively low power level P3).

Additionally or alternatively there can be provision that, as can also be seen in FIG. 7, a region b of the pitch characteristic curve of a lowered blade angle between an increased air density ρ> and a reduced air density ρ< around the minimum at a relatively low power P3 is lower than a region B at a relatively high power P1. In other words, it can be stated that the density region B of the pitch characteristic curve of a decreased blade angle between an increased air density ρ> and a reduced air density ρ< around the minimum below the strictly monotonously falling function, indicated by dashed lines, extends over a larger density interval at a relatively high power P1 than the density region b of the pitch characteristic curve of a decreased blade angle between an increased air density ρ> and a reduced air density ρ< around the minimum below the strictly monotonously falling function, indicated by dashed lines, at a relatively low power P3. It is apparent that the wind turbine can be basically operated with the measures explained above with an increased rotational speed in the region of a reference density ρ0, which applies for the location, of an atmosphere at the location in the region around the minimum α0 of a decreased pitch angle of the pitch characteristic curve (that is to say in the region of a decreased blade angle between an increased air density ρ> and a reduced air density ρ< around the minimum below the strictly monotonously falling function, indicated by dashed lines, as specified by way of example by means of the values (B, m) and (b, M) explained above).

The control structure in FIG. 8 shows in illustrative fashion a generator 401 and a rotor blade 403 which can be adjusted by means of a pitch drive 405. These elements are illustrated only symbolically and, for example, three rotor blades 403 can each be provided with a pitch drive 405, which pitch drive 405 are driven by the wind and as a result drive the generator 401.

The generator 401 is provided here as an externally excited synchronous generator and is actuated in the structure by means of a current controller 407 which controls the exciter current $I_E$. As a result, a power control process is performed which is indicated here only in a simplified fashion and can also be performed in a different way. It is also possible to provide other generators. The current controller 407 is also representative here of other power control devices. It receives a power value P as a predefined value, and this power value P is obtained from a rotational speed-power characteristic curve which is stored in a characteristic curve block 409. The characteristic curve block 409 outputs a power value P on the basis of the rotational speed-power characteristic curve as a function of the rotational speed n of the rotor to which the rotor blades 403 belong.

The power value P is input not only into the current controller in order to control the power of the generator 401 via the current controller 407, but also the power value P is also used as an input variable for a blade angle predefining unit 411. The blade angle predefining unit 411 determines, as a function of the power P, a blade angle α which is to be set. In this context, the output power of the wind turbine, that is to say the power which is actually output by the wind turbine, is preferably used as an input variable.

However, for the sake of simplicity and for the purpose of illustration, the output power can be equated here with the power P which a characteristic curve block 409 outputs. The output power is set with a high dynamic so that this simplification for the purpose of illustration is permissible and so that no oscillation problems or risks arise between the power setting, on the one hand, and the adjustment of the blade angle, on the other.

The blade angle predefining unit 411 has a plurality of characteristic curve blocks, of which three characteristic curve blocks K1, K2 and K3 are shown here by way of example; that is to say a family of air-density-dependent pitch characteristic curves Kα,ρ which are referred to below as K1, K2, K3 and are to be considered part of a characteristic curve diagram Kα (P, n, ρ). Each of these characteristic curve blocks therefore has a power-dependent blade angle characteristic curve which together form a family of characteristic curves and are available for selection. It is then proposed to select one of the characteristic curve blocks and therefore one of the characteristic curves in accordance with the air density ρ. The air density ρ can be acquired for this, for example, by means of a measuring unit 413.

The blade angle α can therefore be set as a function of the output power P and the air density ρ. Therefore, the output power P forms the input variable for the blade predefining unit 411, and the air density ρ is input by virtue of the fact that an adapted characteristic curve is selected as a function of the air density ρ. The blade angle α which is determined in this way is then sent to the pitch drive 405 in order to correspondingly set the respective rotor blade 403.

Therefore, a solution is proposed for improving the prior art in which rotor blades are configured in such a way that at a standard air density of ρ_norm=1.225 kg/m³ and especially below it there can be a flow without separation at all operating points of the wind turbine and nevertheless loads are controlled even in the case of a raised density.

It has been realized that increasingly wind turbines are planned at locations at which the air density lies, in some case significantly, below and especially also above the standard air density. Basically, an increase in an effective attitude angle of the rotor blade can result in flow separations which in turn can lead to considerable power losses. Furthermore, it has been realized that as the air density decreases and the effective attitude angle of the rotor blade increases it becomes more probable that power-reducing flow separations will occur.

The family of air-density-dependent pitch characteristic curves Kα,ρ, which are referred to below as K1, K2, K3 and are to be understood as part of the characteristic curve diagram Kα (P, n, ρ), such flow separations can be counteracted or they can at any rate be reduced or even prevented. By pitching the rotor blades according to the pitch characteristic curves Kα,ρ it is possible to advantageously avoid the flow separations.

It has been proposed here that the pitching of the rotor blades be adapted to the air density. Accordingly it is proposed that the blade angle which is to be set is then a function depending on the electrical output power, specifically the output power and the air density; specifically depending on the air density at a reference density ρ0, which can correspond here to the standard density ρ_norm of a standard atmosphere, but can generally be a reference density ρ0. In particular, the reference density ρ0 can be a "cold climate" air density (that is to say, for example, a reference density ρ0 where ρ>=1.3 kg/m³, with it being understood that that value ρ>=1.3 kg/m³ is basically selected by way of example and another value between a standard density ρ_norm and 1.3 kg/m³ could also be selected as a "cold climate" air density for a reference density).

It is therefore proposed that only a function of the electrical output power is used as the basis for the setting of the blade angle. It is also proposed to measure, if not the air density directly, for example the air pressure and the temperature and, if appropriate, the air humidity on the wind turbine and to calculate the air density therefrom or, if appropriate, in one refinement to take into account the installation altitude of the wind turbine so that the respective blade angle can be determined using a stored function.

Finally, in this way it is therefore also possible to achieve an increase in the annual energy production of a pitch-controlled, rotational-speed-variable wind turbine by means of the proposed use of pitch characteristic curves which are adapted to the air density of the location.

The invention claimed is:

1. A method for operating a wind turbine at a location having an air density, comprising:
   specifying the air density at the location of the wind turbine, wherein the wind turbine includes:
   an aerodynamic rotor having a plurality of rotor blades, wherein the plurality of rotor blades have adjustable blade angles and the aerodynamic rotor is capable of being operated with a rotor speed that is variable; and
   a generator coupled to the aerodynamic rotor, and
   setting a blade angle based on a pitch characteristic curve, the pitch characteristic curve specifying the blade angle as a function of the air density at the location of the wind turbine and at least one of: an output power, torque, and the rotor speed of the wind turbine, wherein according to the pitch characteristic curve the blade angle has a minimum, as the function of the air density, in a region of a reference density of an atmosphere at the location of the wind turbine.

2. The method as claimed in claim 1, wherein the reference density is a standard density of a standard atmosphere.

3. The method as claimed in claim 1, wherein in the pitch characteristic curve of the blade angle as the function of the air density, the minimum is a mathematical local minimum.

4. The method as claimed in claim 3, wherein at the mathematical local minimum, the blade angle as the function of the air density is lower than a first blade angle at a first air density that is higher than the reference density and that is lower than a second blade angle at a second air density that is less than the reference density.

5. The method as claimed in claim 1, wherein in the pitch characteristic curve of the blade angle as the function of the air density, the minimum of the blade angle is a global minimum and is a smallest blade angle of the pitch characteristic curve.

6. The method as claimed in claim 1, wherein the region of the reference density of the atmosphere at the location includes air densities within +/−10% or +/−5% of the reference density.

7. The method as claimed in claim 1, wherein the blade angle based on the pitch characteristic curve increases starting from the reference density as the air density decreases and as the air density increases.

8. The method as claimed in claim 1, comprising:
determining ambient variables of the wind turbine including the air density and temperature which are relevant for the wind turbine; and/or
determining air pressure and the air temperature, and determining the air density based on the air pressure and the air temperature; and/or
determining the air pressure, the air temperature and air moisture, and determining the air density based on the air pressure, the air temperature and the air moisture.

9. The method as claimed in claim 1, wherein the air density is a current air density at the location of the wind turbine, and the air density is determined in a transient fashion or repeatedly at predetermined intervals.

10. The method as claimed in claim 9, comprising:
setting the blade angle dynamically in accordance with the pitch characteristic curve.

11. The method as claimed in claim 1, wherein:
the air density is a prevailing air density,
the air density is variable and permanently predefined for the location,
the air density is determined once or repeatedly, or
the air density is predefined as an average air density at the location.

12. The method as claimed in claim 11, wherein the air density is the prevailing air density at the location, and wherein the method comprises:
setting the blade angle statically in accordance with the pitch characteristic curve.

13. The method as claimed in claim 1, wherein the pitch characteristic curve is a part of a characteristic curve diagram, and wherein the method comprises:
storing a plurality of pitch characteristic curves respectively corresponding to a plurality of different reference densities; and
selecting the pitch characteristic curve from the stored plurality of pitch characteristic curves based on an acquired air density.

14. The method as claimed in claim 13, comprising:
determining a scaling factor as a ratio of the acquired air density to the reference density;
scaling the pitch characteristic curve using the scaling factor; and
setting the blade angle in accordance with the pitch characteristic curve.

15. The method as claimed in claim 14, wherein the pitch characteristic curve specifies the blade angle as a function of an acquired current or prevailing air density, and wherein the pitch characteristic curve specifies the blade angle as the function of the air density and at least one of: the output power, the torque, or the rotor speed.

16. The method as claimed in claim 1, comprising:
defining a tower clearance and/or a blade deflection of a rotor blade at the reference density of the atmosphere at the location, wherein the tower clearance is a horizontal distance in a region of a blade tip of the rotor blade and the and/or a blade deflection of the rotor blade is with respect to a tower when the rotor blade passes the tower, wherein the minimum of the blade angle is defined such that the tower clearance is at a minimum.

17. The method as claimed in claim 1, wherein the pitch characteristic curve has a progression such that when the blade angle is set, a minimum tower clearance:
is maintained or remains constant while predefining at least the pitch characteristic curve at least for an increased air density; and/or
is lowered for a reduced air density compared with a linearly decreasing minimum tower clearance as the function of the air density for an identically increased or reduced air density.

18. The method as claimed in claim 1, wherein the blade angle is lowered and/or a rated rotational speed is increased during rated operation in the region of the reference density for the location, wherein the region is between a first blade angle of a first air density that is greater than the reference density of a standard atmosphere and a second blade angle of a second air density that is less than the reference density of the standard atmosphere.

19. The method as claimed in claim 1, wherein:
the pitch characteristic curve has a flatter form around the minimum at a first power than at a second power that is lower than the first power; and/or
a region of the pitch characteristic curve, having a lowered blade angle, around the minimum at the first power is wider than the region at the second power.

20. The method as claimed in claim 1, wherein the wind turbine is operated in the region of the reference density in the region around the minimum of the pitch characteristic curve with an increased rotational speed.

21. The method as claimed in claim 1, wherein the pitch characteristic curve specifies the blade angle to be set for a partial load operation and/or for a transition from the partial load operation into a rated load operation, wherein in the partial load operation wind is weak that the wind turbine is not yet operated with a maximum output power.

22. The method as claimed in claim 1, wherein the location is characterized by a cold climate and the reference density is a cold climate air density of the location.

23. The method as claimed in claim 22, wherein the location of the wind turbine characterized by the cold climate has:
an average temperature over a year below 0° C., and/or
a minimum temperature over the year below −15° C.

24. The method as claimed in claim 23, wherein the location has the average temperature over the year below −15° C. and/or the minimum temperature over the year below −20° C.

25. The method as claimed in claim 1, wherein the reference density is 1.3 kg/m³ or greater.

26. A device for performing open-loop and/or closed-loop control of a wind turbine at a location having an air density, comprising:

an operational control system configured to:
specify the air density at the location of the wind turbine, the wind turbine having an aerodynamic rotor with a plurality of rotor blades having a respective plurality of blade angles that are adjustable, and the wind turbine having a generator that is coupled to the aerodynamic rotor, and the aerodynamic rotor being capable of being operated with a rotor speed that is variable;
retain a pitch characteristic curve; and
set a blade angle of a rotor blade of the plurality of rotor blades based on the pitch characteristic curve,
the pitch characteristic curve specifying the blade angle as a function of the air density at the location of the wind turbine and at least one of: an output power, torque and the rotor speed of the wind turbine, wherein according to the pitch characteristic curve, the blade angle, as the function of the air density, has a minimum in a region of a reference density at the location of the wind turbine.

27. A wind turbine, comprising:
the aerodynamic rotor;
the generator; and
the device as claimed in claim 26 including the operational control system.

* * * * *